United States Patent
Liu et al.

(10) Patent No.: US 9,112,401 B2
(45) Date of Patent: Aug. 18, 2015

(54) CORELESS PERMANENT MAGNET MOTOR WITH SURFACE CHARGED MAGNET

(75) Inventors: LiSheng Liu, Shenzhen (CN); Yue Li, Hong Kong (CN); HongJian Zhang, Shenzhen (CN); Guoji Zhang, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 277 days.

(21) Appl. No.: 13/179,847

(22) Filed: Jul. 11, 2011

(65) Prior Publication Data

US 2012/0013216 A1 Jan. 19, 2012

(30) Foreign Application Priority Data

Jul. 14, 2010 (CN) .......................... 2010 1 0230798

(51) Int. Cl.
*H02K 16/00* (2006.01)
*H02K 21/12* (2006.01)
*H02K 21/24* (2006.01)
*H02K 1/27* (2006.01)

(52) U.S. Cl.
CPC ..................................... *H02K 21/24* (2013.01)

(58) Field of Classification Search
CPC ....... H02K 21/12; H02K 21/14; H02K 21/24; H02K 16/00; H02K 16/02; H02K 16/04; H02K 1/27; H02K 1/2733; H02K 1/274; H02K 1/2753; H02K 1/2793; H02K 1/28

USPC ................ 310/156.36, 156.37, 112, 114, 268
IPC ........... H02K 21/12,21/14, 21/24, 16/00, 16/02, H02K 16/04, 1/27

See application file for complete search history.

(56) References Cited

U.S. PATENT DOCUMENTS

| | | | | |
|---|---|---|---|---|
| 5,710,476 | A * | 1/1998 | Ampela | 310/268 |
| 5,892,307 | A * | 4/1999 | Pavlovich et al. | 310/156.36 |
| 7,535,145 | B2 * | 5/2009 | Murakami | 310/268 |
| 2001/0030479 | A1 * | 10/2001 | Mohler | 310/156.37 |
| 2005/0194855 | A1 * | 9/2005 | Hasebe et al. | 310/268 |
| 2007/0108860 | A1 * | 5/2007 | Baempfer et al. | 310/156.38 |
| 2007/0152535 | A1 * | 7/2007 | Shibukawa | 310/268 |
| 2010/0072850 | A1 * | 3/2010 | Miyata et al. | 310/156.12 |

* cited by examiner

*Primary Examiner* — Michael Andrews

(74) *Attorney, Agent, or Firm* — Muncy, Geissler, Olds & Lowe P.C.

(57) ABSTRACT

A coreless permanent motor has a stator and a rotor rotatably mounted to the stator. One of the stator or the rotor has at least one winding disc (28). The other one of the stator or the rotor has at least one surface charged magnet disc (33). The winding disc (28) or the magnet disc (33) is formed by two or more sector shaped units that are mounted to two or more support members (27) respectively. The winding disc (28) or the magnet disc (33) is formed by closing the support member (27) and the closed support members (27) form a cylindrical housing. Thus, the structure of the coreless motor is simplified.

19 Claims, 5 Drawing Sheets

CORELESS PERMANENT MAGNET MOTOR WITH SURFACE CHARGED MAGNET

CROSS REFERENCE TO RELATED APPLICATIONS

This non-provisional patent application claims priority under 35 U.S.C. §119(a) from Patent Application No. 201010230798.0 filed in The People's Republic of China on Jul. 14, 2010.

FIELD OF THE INVENTION

This invention relates to electric motors and in particular, to a coreless permanent magnet motor (coreless PM motor).

BACKGROUND OF THE INVENTION

FIG. 1 illustrates a cross section of a traditional coreless PM motor. The coreless PM motor comprises a stator and a rotor. The stator comprises a housing 20', two end caps 21' and 23' that are mounted at respective ends of the housing 20', and two winding discs 28' that are fixed to the housing 20'. The rotor comprises a shaft 31', three permanent magnet discs 32' that are axially charged and fixed to the shaft 31', two magnetically conductive discs 34' that are attached to two of the magnet discs 32'. The magnet discs 32' and the winding discs 28' are arranged alternately. As is illustrated by arrows, the magnetic field generated by the magnet discs 32' forms a closed loop by passing through the winding discs 28', the magnet discs 32' and returning back in the magnetically conductive discs 34'. The axial length is increased because of the magnetically conductive discs 34'.

Further more, each of the winding discs 28', the magnet discs 32' and the magnetically conductive discs 34' is a single piece disc. During the production of the motor, the winding discs 28', the magnet disc 32' and the magnetically conductive discs 34' are mounted one by one in the axial direction. It is time-consuming and thus expensive to assemble. Therefore, there is a desire for an improved coreless PM motor which is easier to assemble and has a shorter axial length.

SUMMARY OF THE INVENTION

Accordingly, in one aspect thereof, the present invention provides a coreless permanent magnet motor, comprising a stator and a rotor rotatably mounted to the stator, wherein one of the stator and the rotor comprises at least one surface charged magnet disc, the other one of the stator and the rotor comprises at least one coreless winding disc, the surface charged magnet disc and the coreless winding disc being axially spaced, the magnetic field at least partly generated by the surface charged magnet disc forming a closed loop by passing through the winding disc and returning back via the surface charged magnet disc.

Preferably, the motor comprises two surface charged magnet discs that are axially spaced, the at least one winding disc being disposed between the two surface charged magnet discs.

Preferably, the motor comprises at least one axially charged magnet disc disposed between the two surface charged magnet discs, the surface charged magnet discs and the axially charged magnet disc being fixed to one of the stator and the rotor, the at least one winding disc and the at least one axially charged magnet discs being alternately disposed and spaced by an air gap, the magnetic field generated by the axially charged magnet disc passing through the winding disc and returning via the surface charged magnet disc.

Preferably, each axially charged magnet disc and surface charged magnet disc is formed by two or more sector shaped magnets that are mounted to two or more support members respectively.

Preferably, the motor comprises two surface charged magnet discs, the motor further comprising a magnetically conductive disc disposed between the two surface charged magnet discs, the magnetically conductive disc and the surface charged magnet discs being fixed to one of the stator and the rotor, the winding disc being disposed between the magnetically conductive disc and a corresponding surface charged magnet disc.

Preferably, the motor further comprises one magnetically conductive disc that is mounted to one of the stator and the rotor, the winding disc being disposed between the surface charged magnet disc and the magnetically conductive disc, the magnetic field generated by the surface charged magnet disc passing through the winding disc and returning back via the magnetically conductive disc.

Preferably, the motor comprises at least one axially charged magnet disc disposed between the surface charged magnet disc and the magnetically conductive disc, the axially charged magnet disc and the surface charged magnet disc being mounted to one of the stator and the rotor, the magnet discs and the winding disc being alternately disposed.

Preferably, the winding disc is formed by two or more sector shaped winding units that are mounted to two or more support members respectively.

Preferably, the two or more support members are joined together to form a cylindrical housing.

Preferably, the stator comprises a position detector for detecting rotation of the rotor.

In second aspect thereof, the present invention provides a coreless permanent magnet motor, comprising a stator and a rotor rotatably mounted to the stator, one of the stator and the rotor comprising at least one winding disc, the other one of the stator and the rotor comprising at least one magnet disc, the magnetic field generated by the magnet disc passing through the winding disc, wherein the winding unit or the magnet disc is formed by two or more sector shaped units that are mounted to two or more support members respectively.

Preferably, the winding unit or the magnet disc is formed by joining together the support members, the joined support members forming a cylindrical housing.

Preferably, the motor comprises at least one surface charged magnet disc.

By implementing the present invention, production of the coreless PM motor is simplified.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

As used in this specification and the appended claims, the term "winding disc" refers to a disc type member formed by coreless windings. The term "magnet disc" refers to a disc type member formed by one or more permanent magnets. The term "axially charged magnet disc" refers to a magnet disc whose permanent magnet is magnetically charged in an axial direction of the magnet disc. The term "surface charged magnet disc" refers to a magnet disc whose permanent magnet is magnetically charged across a surface of the magnet disc such that the magnetic path does not extend axially through the magnet disc.

Figure 2:
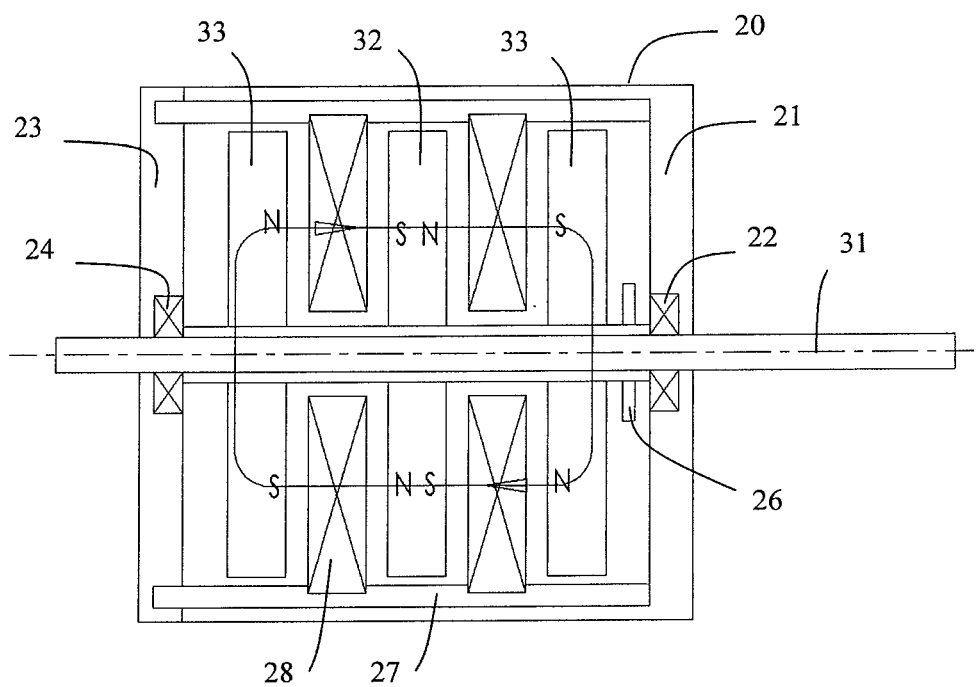
FIG. 2 illustrates a cross section of a coreless PM motor according to a first embodiment of the present invention.

Referring to FIG. 2, the coreless PM motor comprises a stator and a rotor rotatably mounted to the stator. The stator comprises a housing 20, two end caps 21 and 23 mounted at respective ends of the housing 20 and two winding discs 28 mounted to the housing. The stator further comprises a position detector 26 such as a Hall sensor or position encoder for detecting rotation of the rotor.

The rotor comprises a shaft 31, an axially charged magnet disc 32 and two radially charged magnet discs 33 that are fixed to the shaft 31. The two surface charged magnet discs 33 are disposed at respective sides of the axially charged magnet disc 32 and axially spaced there from. Optionally, the magnet discs 32 and 33 are formed by molding permanent magnet material. Preferably, the magnet discs 32 and 33 are fixed to the shaft 31 by directly injection molding the discs to the shaft. By this means, the position of each magnet disc is precisely controlled.

The rotor is mounted to the stator with the rotor shaft 31 rotatably supported by bearings 22, 24 that are supported by respective end caps 21, 23. The magnet discs 32, 33 are disposed inside the stator housing 20, with the axially charged magnet disc 32 disposed between the two winding discs 28. Each of the winding discs 28 is disposed between the axially charged magnet disc 32 and a corresponding surface charged magnet disc 33. An air gap is formed between each winding disc 28 and corresponding magnet disc.

Figure 3:
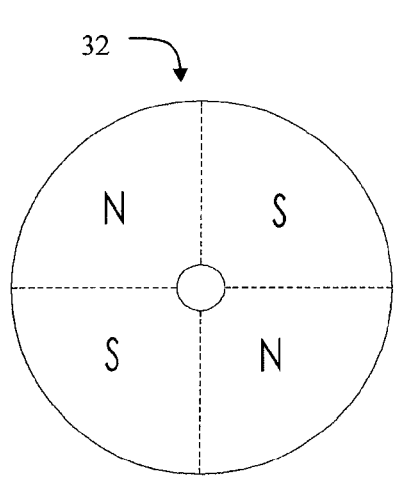
FIG. 3 illustrates an axially charged magnet disc used in the coreless PM motor of FIG. 2.

The axially charged magnet disc 32, as shown in FIG. 3, is formed by four sector shaped permanent magnets. Each of the four permanent magnets is charged in the axial direction of the magnet disc 32. The four permanent magnets are disposed in such a way that there are two north (N) poles and two south (S) poles at each side of the axially charged magnet disc 32 and the N poles and S poles are alternately distributed in the circumferential direction. Alternatively, the magnet disc 32 could be formed by a single disc type permanent magnet.

Figure 4:
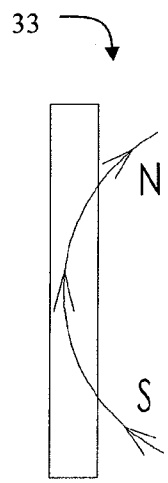
FIG. 4 and FIG. 5 illustrate a surface charged magnet disc used in the coreless PM motor of FIG. 2.
Figure 5:
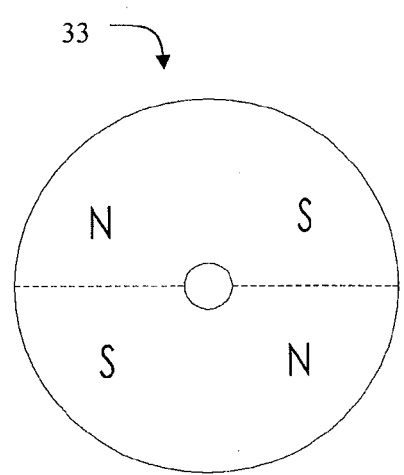

Referring to FIG. 4 and FIG. 5, each of the surface charged magnet discs 33 is formed by two semi-circular permanent magnets. Each semi-circular permanent magnet is surface charged across one surface of the disc and has one N pole and one S pole formed on the surface. The two semi-circular permanent magnets are arranged in such way that there are two N poles and two S poles at the end surface of the magnet disc 32 and the N pole and S pole are alternately arranged in the circumferential direction.

Referring to FIG. 2 and FIG. 4, as is illustrated by arrows, the magnetic field generated by the magnet discs 32 and 33 forms a closed loop by passing through the axially charged magnet disc 32 and returning back through or by the surface charged magnet discs 33.

Figure 6:
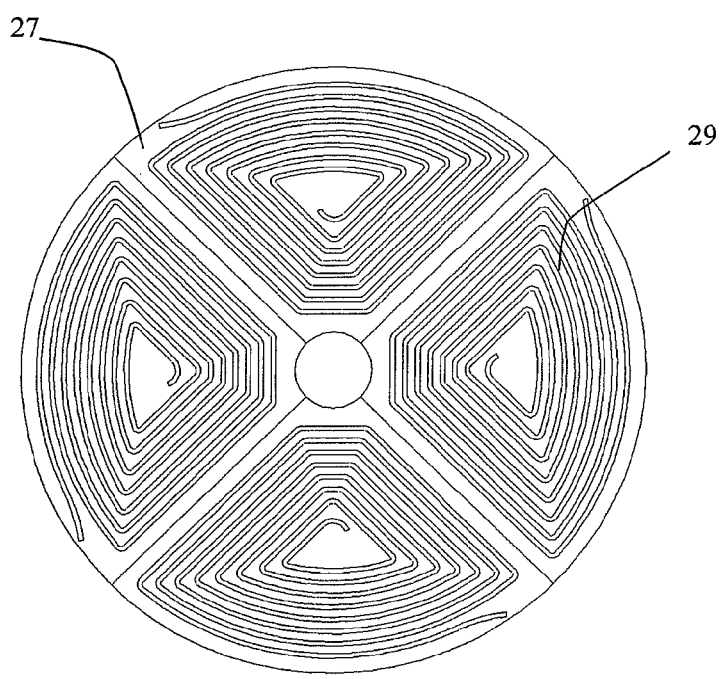
FIG. 6 illustrates a winding disc used in the coreless PM motor of FIG. 2.
Figure 7:
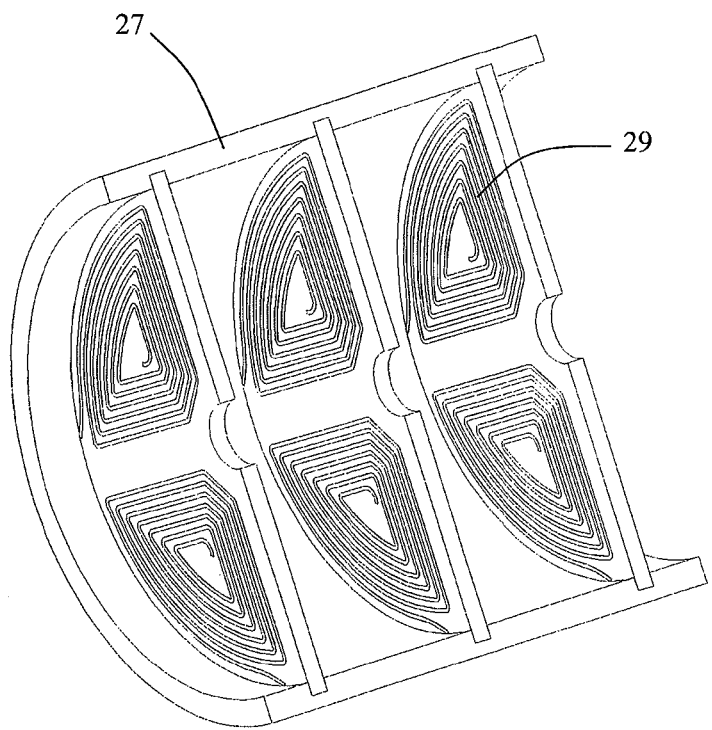
FIG. 7 illustrates a support member and winding units mounted to the support member used in the coreless PM motor of FIG. 2.

As shown in FIG. 6 and FIG. 7, each winding disc 28 is formed by closing two semi-circular members. Each semi-circular member comprises two sector shaped coreless winding units 29 that are molded together. Each semi-circular member is mounted to and supported by an arc shaped support member 27. Preferably, as is shown in FIG. 7, three semi-circular members of three winding discs are held by a single support member 27. The semi-circular members of the winding disc may be fixed to the support member 27 by over molding the support member 27 directly onto the semi-circular members. Alternatively, the support member and the three semi-circular members may be molded as a single unit directly to the winding units 29 using an insert molding process. In this manner the position of each winding unit 29 is precisely controlled by the mold. The three winding discs 28 are formed by closing the two support members 27. This is an efficient way to form the winding discs since it is not necessary to mount the winding discs 28 and magnet discs one by one. A person skilled in the art should recognize that, depending on the number of the semi-circular members, less than or more than three winding discs 28 could be formed by closing the support members 27. Also, the number of the support members 27 could be more than two.

During production, the rotor is formed by mounting or fixing the magnet discs 32 and 33 to the rotor shaft 31. The bearings 22 and 24 are mounted to the end caps 21 and 23, respectively. The rotor is then mounted to the end caps 21 and 23, with the rotor shaft 31 supported by the bearings 22 and 24. The two support members 27 are disposed outside the rotor and joined together to form the winding discs 28. The joined support members 27 form a cylindrical housing. The joined support members 27, the end caps 21 and 23 as well as the rotor are then pressed inside the cylinder housing 20. The end caps 21, 23 are then fixed with the housing 20 by means of bolts or rivets. The coreless PM motor is suitable for mass production and the production efficiency is high. The position of the winding discs 28, the magnet discs 32 and 33 are precisely controlled by the mold.

Figure 1:
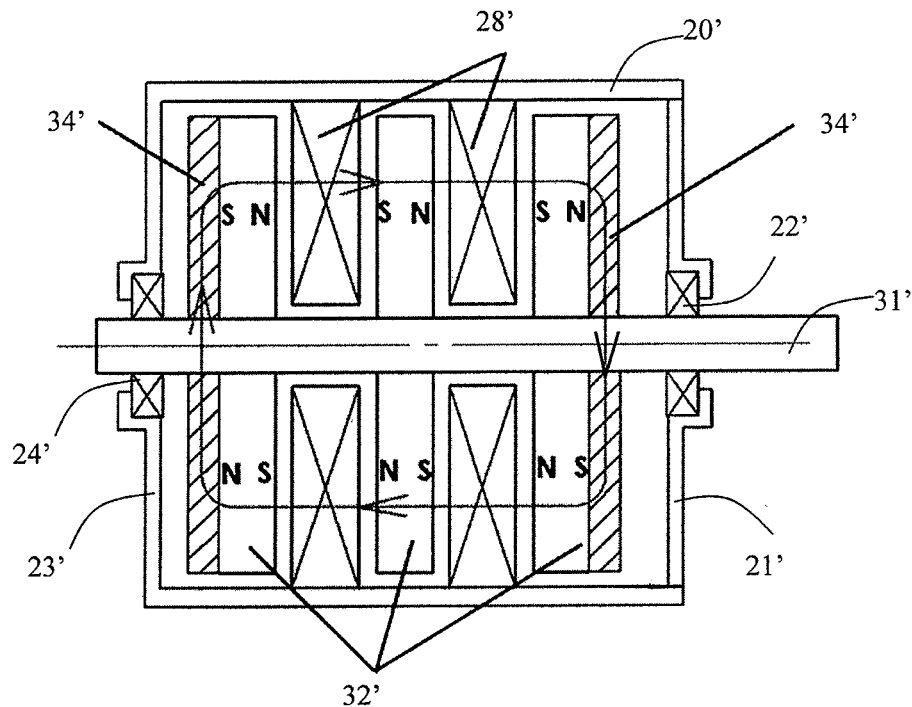
FIG. 1 illustrates a cross section of a traditional coreless PM motor.

Further more, traditional magnetically conductive discs (refer to FIG. 1) are not required since the magnetic field is returned by the surface charged magnet discs 33. Thus the number of components and the axial length of the motor is reduced. A person skilled in the art should recognize that the axially charged magnet disc 32 could be omitted to further reduce the axial length of the motor. Alternatively, additional axially charged magnet discs 32 and winding discs 28 could be used to further improve the performance of the motor. Preferably, the number of winding discs 28 is larger than the number of axially charged magnet discs 32 by one.

Figure 8:
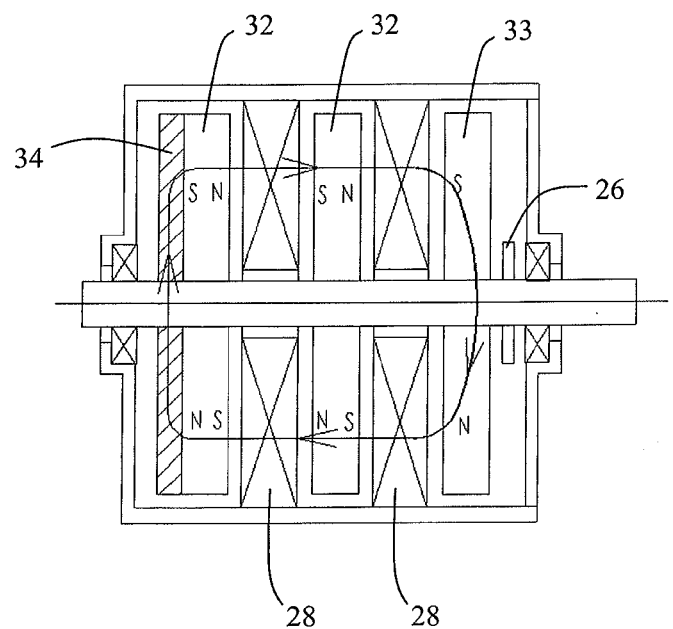
FIG. 8 illustrates a coreless PM motor according to a second embodiment of the present invention.

The coreless PM motor of FIG. 8 is different from the motor of FIG. 2 in that one of the surface charged magnet discs 33 in FIG. 2 is replaced by a magnetically conductive disc 34 and an axially charged magnet disc 32. The magnetically conductive disc 34 is attached to the axially charged magnet disc 32 on the side remote from the winding discs 28. Compared to traditional coreless PM motor, the number of components of the motor of FIG. 8 is also reduced.

Figure 9:
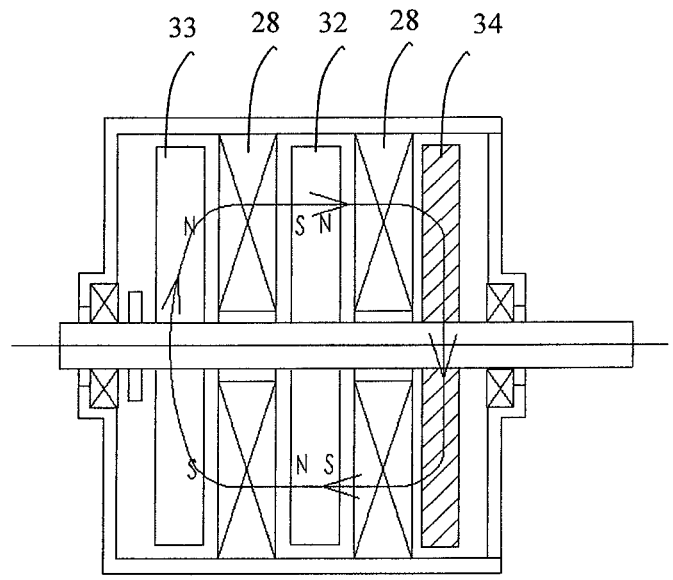
FIG. 9 illustrates a coreless PM motor according to a third embodiment of the present invention.

The coreless PM motor of FIG. 9 is different from the motor of FIG. 2 in that one of the surface charged magnet discs 33 of FIG. 2 is replaced by a magnetically conductive disc 34. The winding discs 28 and the axially charged magnet disc(s) 32 are disposed between the magnetically conductive disc 34 and the remaining surface charged magnet discs 33. Preferably, the number of winding discs 28 is larger than the number of axially charged magnet disc(s) 32 by one. The magnetic field forms a closed loop by passing through the winding discs 28, the axially charged magnet disc 32 and returning back via the surface charged magnet disc 33 and the magnetically conductive disc 34. Thus the number of parts of the motor is reduced.

Figure 10:
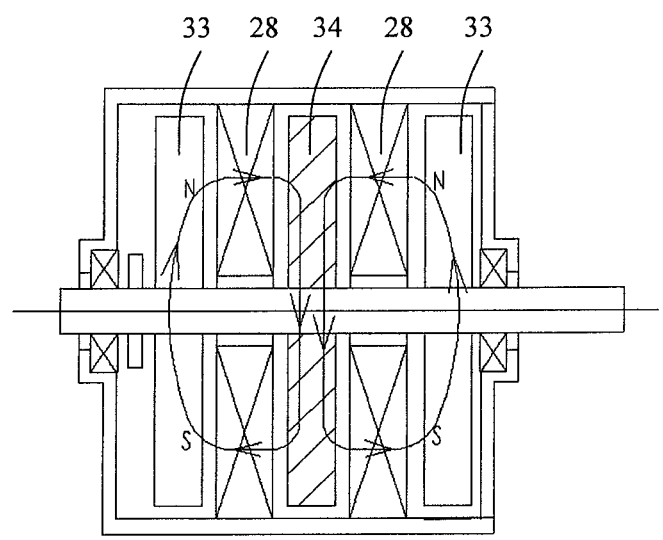
FIG. 10 illustrates a coreless PM motor according to a fourth embodiment of the present invention.

The coreless PM motor of FIG. 10 is different from the motor of FIG. 2 in that one of the axially charged magnet discs 32 is replaced by one magnetically conductive disc 34.

Figure 11:
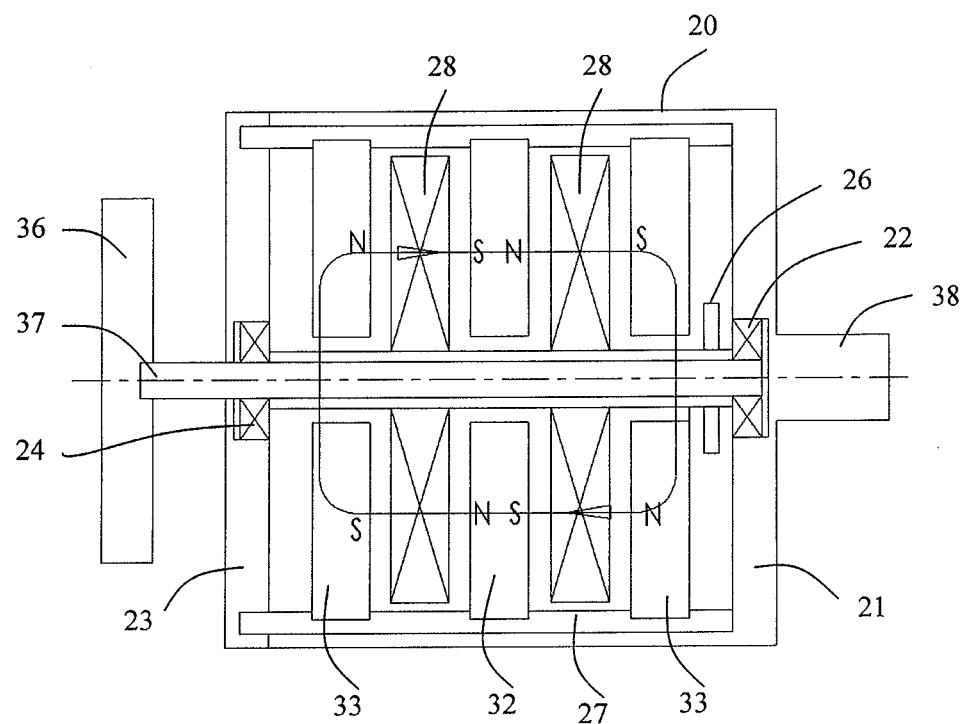
FIG. 11 illustrates a coreless PM motor according to a fifth embodiment of the present invention.

The coreless PM motor of FIG. 11 is different from the motor of FIG. 2 in that the motor of FIG. 11 is an outer rotor PM motor. In this embodiment, the stator of the PM motor comprises a base 36, a shaft 37 fixed to the base 36 and winding discs 28 fixed to the shaft 37. The rotor comprises a housing 20, an axially charged magnet disc 32 and two surface charged magnet discs 33. Each of the magnet discs 32, 33 is formed by two or more sector shaped permanent magnets. Each sector shaped permanent magnet is mounted to a corresponding support member 27. Preferably, the support member 27 is made of plastic and is formed by injection molding over the sector shaped magnets. The support members 27 are then closed together to form the magnet discs 32, 33. An air gap is formed between an inner central hole of the magnet discs 32, 33 and the fixed shaft 37. The support members 27 are pressed inside the housing 20. An output shaft 38 is mounted to one end of the outer rotor.

A position detector 26 such as a Hall sensor or position encoder is mounted to the stator to detect rotation of the rotor. Preferably, the position detector 26 is mounted to the fixed shaft 37.

Figure 12:
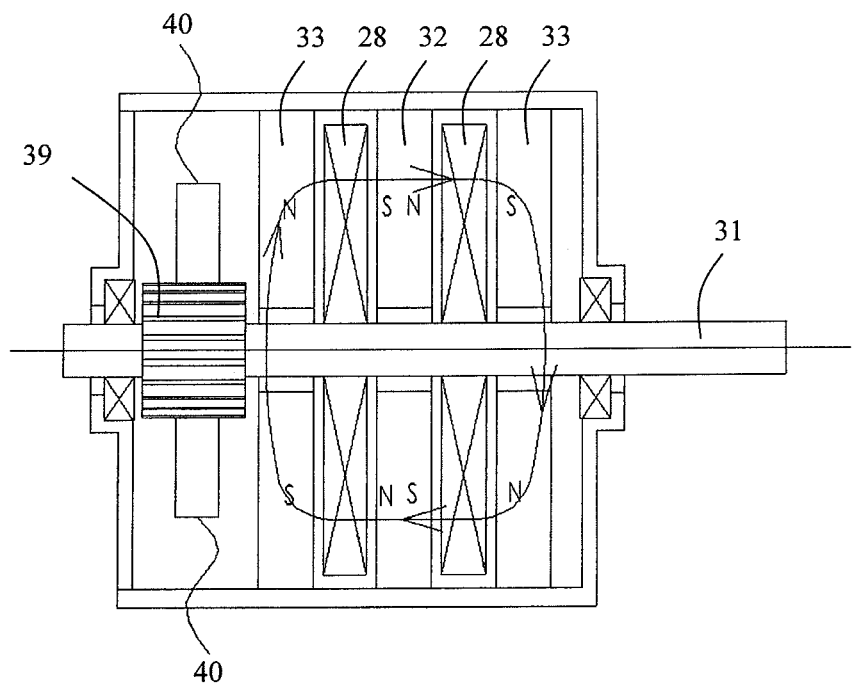
FIG. 12 illustrates a coreless PM motor according to a sixth embodiment of the present invention.

The coreless PM motor of FIG. 12 is different from the coreless PM motor of FIG. 2 in that the PM motor of FIG. 12 is a brush motor. The stator comprises the housing, the support members and the magnet discs 32, 33 that are mounted to the support members. The rotor is rotatably mounted inside the stator. The rotor comprises a rotor shaft 31, winding discs 28 fixed to the rotor shaft 31, and a commutator 39 mounted on the rotor shaft 31. The commutator 39 comprises a plurality of segments that are electrically connected to the winding discs 28. The stator also comprises at least two brushes 40 that making sliding contact with the segments of the commutator 39 to feed electrical current to the winding discs 28.

In the description and claims of the present application, each of the verbs "comprise", "include", "contain" and "have", and variations thereof, are used in an inclusive sense, to specify the presence of the stated item but not to exclude the presence of additional items.

Although the invention has been described with reference to one or more preferred embodiments, it should be appreciated by those skilled in the art that various modifications are possible. Therefore, the scope of the invention is to be determined by reference to the claims that follow.

The invention claimed is:

1. A coreless permanent magnet motor, comprising a stator and a rotor rotatably mounted to the stator, wherein one of the stator and the rotor comprises at least one homogeneous surface charged magnet disc made of a permanent magnet material, the other one of the stator and the rotor comprises at least one coreless winding disc, the surface charged magnet disc and the coreless winding disc being axially spaced, the magnetic field at least partly generated by the surface charged magnet disc forming a closed loop by passing through the winding disc and returning back via the surface charged magnet disc, wherein the surface charged magnet disc has a pair of opposite major surfaces and is surface charged across one of the major surfaces to form at least a pair of opposite magnetic poles on said one of the major surfaces, the magnetic field entering into said one of the major surfaces from a south pole of said at least a pair of opposite magnetic poles, passing said one of the major surfaces in a direction from the south pole of said at least a pair of opposite magnetic poles to a north pole of said at least a pair of opposite magnetic poles, and exiting said one of the major surfaces from the north pole of said at least a pair of opposite magnetic poles.

2. The motor of claim 1, wherein the motor comprises two surface charged magnet discs that are axially spaced, the at least one winding disc being disposed between the two surface charged magnet discs.

3. The motor of claim 2, wherein the motor comprises at least one axially charged magnet disc disposed between the two surface charged magnet discs, the surface charged magnet discs and the axially charged magnet disc being fixed to one of the stator and the rotor, the at least one winding disc and the at least one axially charged magnet discs being alternately disposed and spaced by an air gap, the magnetic field generated by the axially charged magnet disc passing through the winding disc and returning via the surface charged magnet disc.

4. The motor of claim 2, wherein each axially charged magnet disc and surface charged magnet disc is formed by two or more sector shaped magnets that are mounted to two or more support members respectively.

5. The motor of claim 1, wherein the motor comprises two surface charged magnet discs, the motor further comprising a magnetically conductive disc disposed between the two surface charged magnet discs, the magnetically conductive disc and the surface charged magnet discs being fixed to one of the stator and the rotor, the winding disc being disposed between the magnetically conductive disc and a corresponding surface charged magnet disc.

6. The motor of claim 1, wherein the motor further comprises one magnetically conductive disc that is mounted to one of the stator and the rotor, the winding disc being disposed between the surface charged magnet disc and the magnetically conductive disc, the magnetic field generated by the surface charged magnet disc passing through the winding disc and returning back via the magnetically conductive disc.

7. The motor of claim 6, wherein the motor comprises at least one axially charged magnet disc disposed between the surface charged magnet disc and the magnetically conductive disc, the axially charged magnet disc and the surface charged magnet disc being mounted to one of the stator and the rotor, the magnet discs and the winding disc being alternately disposed.

8. The motor of claim 1, wherein the winding disc is formed by two or more sector shaped winding units that are mounted to two or more support members respectively.

9. The motor of claim 8, wherein the two or more support members are joined together to form a cylindrical housing.

10. The motor of claim 1, wherein the stator comprises a position detector for detecting rotation of the rotor.

11. The motor of claim 1, wherein the rotor defines an axis and the major surfaces of the surface charged magnet disc are perpendicular to the axis of the rotor.

12. The motor of claim 1, wherein each surface charged magnet disc is formed by two or more sector shaped magnets, each magnet having a pair of opposite magnetic poles formed on said one of the major surfaces.

13. The motor of claim 1, wherein the magnetic path generated by the surface charged magnet disc does not extend axially through the other one of the major surfaces.

14. The motor of claim 1, wherein the one of the stator and the rotor further comprises a shaft, and the at least one homogeneous surface charged magnet disc is fixed to the shaft by directly injection molding the permanent magnet material to the shaft.

15. A coreless permanent magnet motor, comprising:
a stator; and
a rotor rotatably mounted to the stator,
wherein one of the stator and the rotor comprises at least one surface charged magnet disc which comprises a plurality of sections arranged in a circumferential direction thereof, each of the plurality of sections is made of a permanent magnet material and has a pair of major surfaces perpendicular to an axis of the rotor, the at least one surface charged magnet disc is surface charged such that each section forms a permanent magnetic pole on one of the pair of major surfaces and a plurality of south poles and north poles being alternatively arranged on said one of the pair of major surfaces in the circumferential direction;
the other one of the stator and the rotor comprises at least one careless winding disc; and
the surface charged magnet disc and the coreless winding disc is axially spaced,
wherein the magnetic field at least partly generated by the at least one surface charged magnet disc form a closed loop by passing through the winding disc and returning back via the at least one surface charged magnet disc, the magnetic field entering into said one of the major surfaces from a south pole, passing said one of the pair of major surfaces from a south pole to an adjacent north pole in the circumferential direction, and exiting said one of the major surfaces from the adjacent north pole.

16. The coreless permanent magnet motor of claim 15, wherein the at least one surface charged magnet disc is formed by at least two sector shaped permanent magnets.

17. The coreless permanent magnet motor of claim 15, wherein the at least one surface charged magnet disc is a monolithic surface charged magnet disc.

18. The coreless permanent magnet motor of claim 15, wherein the one of the stator and the rotor further comprises a shaft, and the at least one surface charged magnet disc is fixed to the shaft by directly injection molding the permanent magnet material to the shaft.

19. The coreless permanent magnet motor of claim 15, wherein each of the plurality of sections is exclusively made of the permanent magnet material.

* * * * *